June 7, 1966
W. H. MORHAM ET AL
3,254,471
MACHINE FOR HEAT SEALING AND CUTTING
FLUID-FILLED THERMOPLASTIC TUBING
Filed Aug. 28, 1962
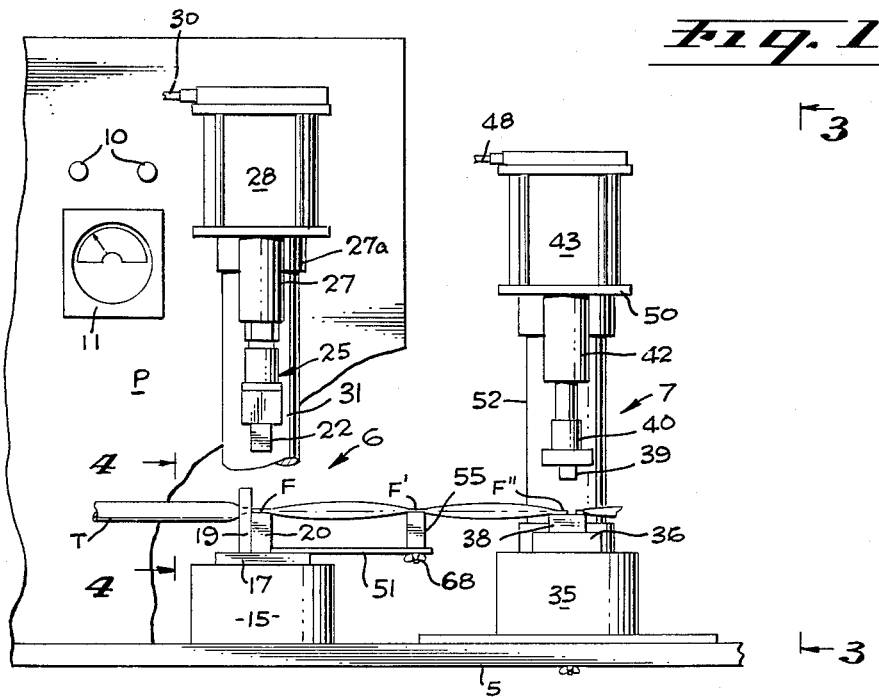
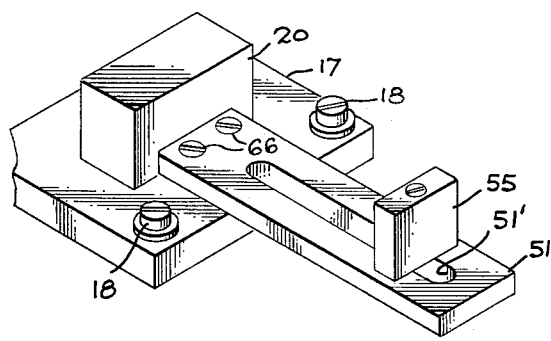
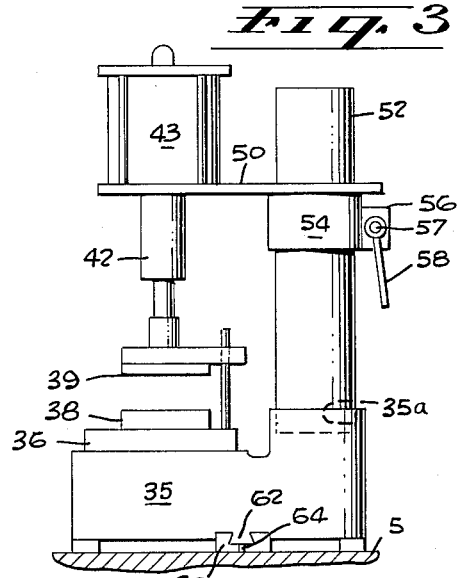
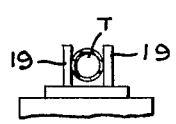
INVENTORS
WALTER H. MORHAM
ANDREW M. MARTIN
BY
Mason & Graham
ATTORNEYS

United States Patent Office 3,254,471
Patented June 7, 1966

3,254,471
MACHINE FOR HEAT SEALING AND CUTTING
FLUID-FILLED THERMOPLASTIC TUBING
Walter H. Morham, Briarcliff Manor, N.Y., and Andrew
M. Martin, Palos Verdes Estates, Calif., assignors to
Andrew M. Martin Company, a copartnership consisting of Charles E. Frosst & Co., a Canadian corporation, and Andrew M. Martin, Los Angeles, Calif.
Filed Aug. 28, 1962, Ser. No. 219,949
2 Claims. (Cl. 53—182)

Our present invention has to do with devices for heat sealing and cutting fluid-filled thermoplastic tubing into relatively short lengths, and relates more particularly to a device of this character peculiarly designed for manual operation and operable simultaneously to heat seal one length of tubing while a previously heat sealed length is being cut or severed.

Usually the machines available for heat sealing and cutting such tubing are substantially automatic and rather complicated and, in many instances, such machines are sold for use in areas in which skilled workers are not readily available for operating or servicing complicated automatic machinery. There has therefore been a long need for a simple, efficient, economical, completely manually operable machine which does not require skilled labor to operate or service, and which is so designed as to avoid personal injury to workmen.

It is therefore an object of our invention to provide a device of the latter character which is constructed and designed to facilitate efficient hand operation by unskilled persons.

It is another object to provide, in such a device, simple means for enabling the operator to produce sealed lengths of fluid-filled tubing wherein the lengths are uniform, as well as to change the lengths when desired.

A still further object of our invention is to provide a device of this character which has novel means for adjusting the lengths of the heat-sealed portions of the tubing.

With these objects in view, we will now, for the purpose of explaining our invention, describe a presently preferred embodiment thereof, for which purpose we will refer to the accompanying drawing wherein:

FIG. 1 is a front elevational view;

FIG. 2 is an enlarged perspective view of a portion of our device;

FIG. 3 is a reduced side elevation taken on line 3—3 of FIG. 1; and

FIG. 4 is a view taken on line 4—4 of FIG. 1.

With reference to the drawing, we show a flat base 5 upon which we mount, in any suitable manner, a conventional sealing unit generally denoted 6, and a conventional tube cutting or severing unit generally denoted 7.

A conventional electrical control panel P may be mounted on the base behind the units 6 and 7 and carry the usual control knobs 10 and dial 11 for controlling the indicating the high frequency alternating electrical current passed through the tubing through the sealing dies to be described.

The heat sealing unit 6 has a base portion 15 secured to the base 5 and upon which a plate 17 is secured as by bolts 18; the plate 17 carrying an upright die element 20 and two upright laterally spaced guide fingers 19 for guiding the tube T onto the die element 20. The companion sealing die element 22 is secured in the usual manner to the bottom end of a ram 25 whose upper end is reciprocally mounted in a cylinder 27 controllably supplied with fluid under pressure in a fluid cylinder 28, it being our preference to use air as the fluid, supplied from a source, not shown, through a conduit 30. The elements 25, 27 and 28 are slideably supported on a rod 31 from the base portion 15, so as to be vertically adjustable relative to the base.

The cutter unit 7 has a base portion 35 carrying a plate 36 upon which is secured a cutting die element 38. The companion cutter element 39 is secured on the bottom end of a ram 40 whose upper end is reciprocally mounted in a fluid cylinder 42 which is supplied with fluid under pressure from a source, not shown, through a main cylinder 43. It is also our preference to use air as the actuating fluid, the air being supplied from the source through a flexible conduit 48.

Elements 42 and 43 are vertically slideably adjustably supported by means of an arm 50 from an upright rod 52 whose bottom end portion fits in a recess 35a in base portion 35, the arm 50 being secured in any adjusted position on the post 52 by a split sleeve 54 embracing post 52, the sleeve having opposed flange portions 56 adapted to be drawn together by a screw 57 having a manually engageable handle 58. The cylinder 27 and its carried pressure cylinder 28 may be locked in any vertically adjusted position on rod 31 by means of a split sleeve 27a like the sleeve 54.

Preferably, by conventional means not shown, it is our preference that the units 6 and 7 be made to operate in unison, although the controls may be set to operate them separately if that should be desired.

It is also our preference to so mount the base portion 35 of the unit 7 on the base 5 so that it may be laterally adjusted relative to unit 6 as well as longitudinally of the base. This is accomplished by a slot or track 60 formed longitudinally in the base 5 and a conforming tongue portion 62 depending from said portion 35. A set screw 64 threaded through the base 5 lockably engages the portions 62.

The units 6 and 7 are so adjustably laterally spaced apart as to enable a worker to freely manipulate the tubing T with his hands, between the units, without any personal injury hazard.

At the commencement of the operation, a relatively long length of thermoplastic tubing T, such as of vinyl plastic, is filled with a fluid such, for instance, as shampoo, detergent or the like. Preferably the long length of tubing should be wound about a rotatable drum from which it may be unwound as used. A typical length of such filled tubing would be of the order of about 150 feet. A drum of this character is shown and described in our copending application Serial No. 225,669, filed September 24, 1962.

As by means of screws 66, we secure to the top of the plate 17 an arm 51 which is longitudinally slotted at 51', and adjustably mount on the arm an intermediate tube supporting block 55, which may be secured in any adjusted position along the slot by means of a bolt and thumb nut device 68.

In operation, the user first places the leading end of the tubing against the sealing die element 20 of unit 6 and applied fluid pressure to force the ram 25 downwardly to engage the die element 22 against the top surface of the tubing, compressing it against the die element 20 simultaneously with the application of the electrical current to heat seal the thus flattened portion of the tubing.

Such heat sealed and flattened portions of the tubing are shown at F, F' and F". The operator then manually operates the air controls to return the ram to its upper position (FIG. 1) and manually pulls the tubing through unit 6 until the previously flattened and sealed portion of the tubing may be placed and manually pressed against the intermediate support block 55 so as to firmly hold the tubing in position during the next ensuing operation of the sealing and/or cutting units.

While it is within the purview of our invention to use hot die elements, in which event the dies themselves would be electrically heated, we have found that molten plastic tends to adhere to such die elements. Therefore, it is our preference merely to use the die elements to flatten and maintain pressure on the tubing during the sealing operation and as conductors in a conventional high frequency welding system. That is, the tubing is dielectric and we introduce a high frequency alternating current through the tubing using the die elements as conductors, the electrical current therefore effecting the sealing weld. It is also our preference to utilize a conventional pressure switch, not shown, in the high frequency circuit, which switch will not be actuated to close the circuit until the desired die pressure is exerted on the portion of the tubing to be sealed, so that consistent seals are produced. We may further insure consistency and uniformity of the seals by water cooling the die elements by a conventional water cooling system, not shown.

After enough of said sealing and flattening operations have been performed, the units 6 and 7 may be actuated simultaneously to cut and sever the leading length as the leading end portion of the main length of tubing is heat sealed and flattened by the die elements 20, 22.

A purpose of making the intermediate support 55 adjustable longitudinally of the arm 51 is to be able to adjust the machine to vary the length of the portions to be heat sealed. That is, shorter lengths than those shown in FIG. 1 may be provided by moving the intermediate support 55 towards the heat sealing unit, and vice versa.

Then the heat sealing element 6 is actuated to flatten and heat seal the leading end portion of the next following tubing length. For the next operation, the operator manually pulls the tubing through the machine until the first mentioned flattened and heat sealed portion may be positioned on the cutting die element 38. After three of the tubing lengths have been thus flattened and heat sealed, the simultaneous operation of the units 6 and 7 functions both to sever one previously heat sealed length from another and to heat seal and flatten the leading end of the tube T as shown at F, during which operation the intermediate heat sealed portion of the tube is manually pressed against the intermediate support 55.

By virtue of the adjustable intermediate support 55, the units 6 and 7 may be spaced apart far enough to enable a workman to work with his hands between the units to pull rather than push the tubing through the machine, and to securely anchor the intermediate portion of the tubing between the said units during operation, without there being any hazard of the workman injuring himself by contact with either the heat sealing or cutting unit.

We claim:
1. In a device for heat sealing and cutting a relatively long length of liquid containing thermoplastic tubing into relatively shorter lengths each of which is heat sealed and flattened at its ends,
   (a) a flat base,
   (b) a heat sealing unit carried by said base and having die means for flattening and heat sealing a localized portion of said tubing,
   (c) a tubing cutting unit having die means for severing contiguous portions of said tubing one from the other transversely of said respective flattened portions,
   (d) said cutting unit being adjustable along said base toward and away from said heat sealing unit,
   (e) said units being laterally spaced from each other with their said die means in alignment,
   (f) means for supporting a heat sealed and flattened portion of said tubing midway between said units, comprising an arm carried by and projecting from said heat sealing and flattening unit towards said cutting unit and a tubing supporting block longitudinally adjustably carried by said arm, and
   (g) means for simultaneously actuating said units.

2. In a device for heat sealing and cutting a relatively long length of liquid containing thermoplastic tubing into relatively shorter lengths each of which is flattened and heat sealed at its ends,
   (a) a base,
   (b) a heat sealing unit carried by said base and having die means for flattening and heat sealing a localized portion of said tubing,
   (c) a cutting unit carried by said base and having means for severing contiguous portions of said tubing one from the other transversely of said flattened portion,
   (d) said units being mounted on said base in aligned, laterally spaced relationship,
   (e) means for adjusting one of said units relative to the other,
   (f) an intermediate tube support mounted between and adjustably positionable relative to said units whereby said support may be positioned to receive a previously flattened and heat sealed portion of said tubing; said intermediate tube support comprising an arm secured at its inner end to said heat sealing unit and extending therefrom towards said other unit, said arm having a longitudinal slot therein, and a tube supporting block carried by said arm and being adjustable longitudinally thereof along said slot, and
   (g) means for actuating said units.

References Cited by the Examiner

UNITED STATES PATENTS

| 2,637,959 | 5/1953 | Dreher | 53—180 |
| 2,764,862 | 10/1956 | Rado | 53—180 |
| 2,886,930 | 5/1959 | Martin | 53—180 |
| 3,154,901 | 11/1964 | Hayward | 53—182 X |

FOREIGN PATENTS

| 952,380 | 11/1949 | France. |
| 690,229 | 4/1953 | Great Britain. |

FRANK E. BAILEY, *Primary Examiner.*

TRAVIS S. McGEHEE, *Examiner.*

A. E. FOURNIER, *Assistant Examiner.*